United States Patent
Heyring

[19]

[11] Patent Number: 5,839,741
[45] Date of Patent: Nov. 24, 1998

[54] SUSPENSION WITH INTERCONNECTED TORSION BARS

[75] Inventor: Christopher Brian Heyring, Eagle Bay, Australia

[73] Assignee: Kinetic Limited, Dunsborough, Australia

[21] Appl. No.: 704,660

[22] PCT Filed: Mar. 15, 1995

[86] PCT No.: PCT/AU95/00135

§ 371 Date: Nov. 12, 1996

§ 102(e) Date: Nov. 12, 1996

[87] PCT Pub. No.: WO95/25020

PCT Pub. Date: Sep. 21, 1995

[30] Foreign Application Priority Data

Mar. 15, 1994 [AU] Australia .............................. PM4489

[51] Int. Cl.[6] ........................ B60G 11/18; B60G 21/045; B60G 21/05

[52] U.S. Cl. .............................. 280/124.106; 280/124.13; 280/124.167

[58] Field of Search ................................... 280/840, 721, 280/695, 723, 689, 725, 726, 688, 124.137, 124.104, 124.106, 124.13, 124.134, 124.166, 124.167, 124.103, 124.107, 5.506, 5.507, 5.508, 511

[56] References Cited

U.S. PATENT DOCUMENTS

| 2,099,819 | 11/1937 | Mercier | 280/723 |
|---|---|---|---|
| 2,941,815 | 6/1960 | Muller | 280/721 |
| 3,147,990 | 9/1964 | Wettstein | 280/723 |
| 3,298,709 | 1/1967 | Mercier | 280/840 |
| 3,338,327 | 8/1967 | Bishop | 180/349 |
| 4,014,561 | 3/1977 | Tomiya et al. | 280/723 |

FOREIGN PATENT DOCUMENTS

| 45936 | of 0000 | France | 280/721 |
|---|---|---|---|
| 450518 | 1/1945 | France | 280/840 |
| 1337204 | of 1963 | France | 280/721 |
| 1489223 | of 1967 | France | 280/721 |
| 3-186424 | 8/1991 | Japan | 280/723 |
| 4-221273 | 8/1992 | Japan | 280/689 |
| 443622 | 3/1936 | United Kingdom | 280/721 |

*Primary Examiner*—Paul N. Dickson
*Attorney, Agent, or Firm*—Birch, Stewart, Kolasch & Birch, LLP

[57] ABSTRACT

A vehicle suspension system includes two laterally spaced forward wheel assemblies and two laterally spaced rear wheel assemblies together supporting a vehicle body. Each wheel assembly includes a wheel and a wheel mounting connecting the wheel to the vehicle body for movement relative to the body in the generally vertical direction. Respective first mechanical coupling members interconnect each wheel assembly to the laterally adjacent wheel, and respective second mechanical coupling members interconnect each wheel assembly. The respective second mechanical coupling members are interconnected to control the roll of the vehicle.

32 Claims, 10 Drawing Sheets

SUSPENSION WITH INTERCONNECTED TORSION BARS

BACKGROUND OF THE INVENTION

1. Field of the Invention

This invention relates to improvements in the suspension system for vehicles, and specifically relates to systems in which the suspension elements of the respective wheels are mutually interactive, so as to provide substantially consistent wheel loading on the wheels not directly influenced by wheel travel, and providing improved overall ride and handling characteristics for motor vehicles.

2. Description of the Background Art

In recent times there has been a trend towards resilient sprung suspension systems, incorporating variable damping rates and adjustable spring rates, in an attempt to improve vehicle stability and reduce movement of the vehicle body relative to the surface being traversed.

Some other more advanced suspension systems, commonly referred to as active or semi active suspension systems, incorporate a number of sensors which monitor information such as, vertical wheel travel and body roll, as well as speed, acceleration, steering and braking commands. This and other data is processed by an on-board computer (ECU) which instructs hydraulic or pneumatic actuators to extend or contract at high speed to raise or lower the wheels to follow the uneven terrain, while the vehicle body follows a more level path, without bouncing, rolling and pitching.

These active suspension systems require an intelligent back-up system and call for a substantial input of external energy, drawn continually from the vehicle's engine, to operate the actuators that effect the adjustments to the suspension system.

The active suspension systems described are not only expensive to manufacture and maintain in operation but are subject to electronic and hydraulic failures, such as leaking hydraulic seals, due to the extreme complexity of these suspension systems.

SUMMARY OF THE INVENTION

It is therefore an object of this invention to provide a vehicle suspension system which enables the vehicle to exhibit many of the benefits of the active suspension systems but which is of simple construction and can be utilised for long periods without the associated expenses and complexities of an active suspension system, that require frequent adjustments and servicing.

With this object in view there is provided a vehicle suspension system comprising two laterally spaced forward wheel assemblies and two laterally spaced rear wheel assemblies together supporting a vehicle body, each wheel assembly including a wheel and a wheel mounting connecting the wheel to the vehicle body for movement relative to the body in the generally vertical direction, respective first mechanical coupling means interconnecting each wheel assembly to the laterally adjacent wheel assembly, respective second mechanical coupling means interconnecting each wheel assembly to the longitudinally adjacent wheel assembly, each said first and second mechanical coupling means being adapted to urge in response to movement of one wheel assembly in a substantially vertical direction a movement of the other wheel assembly connected to said same mechanical coupling means in the opposite direction, whereby said first and second mechanical coupling means together control pitch and roll of the vehicle body and to maintain substantially consistent loading on all wheels and thereby maintain traction on all wheels.

The respective first and second mechanical coupling means provide a mechanism whereby, when relative movement occurs in the vertical direction between one wheel and the vehicle body, an opposite movement is urged between the longitudinally adjacent and laterally adjacent wheels respectively. If the mechanical coupling means possesses resilience, the degree of movement will be different, the difference being related to the degree of resilience in the mechanical coupling means and the loading on the relevant wheels.

In a construction where all of the mechanical coupling means are rigid, the suspension system will provide substantially complete avoidance of both roll and pitch control of the vehicle body as the vehicle travels uneven terrain or is subjected to dynamic loadings, such as surface irregularities or cornering at speed.

If there is a degree of resilience in the first mechanical coupling means, this will allow a degree of pitch of the vehicle body, the level of pitch being related to the degree of resilience in the transverse or first coupling means. Similarly, resilience in the second mechanical coupling means will allow a degree of roll of the vehicle body, the level of roll being related to the degree of resilience in the longitudinal or second coupling means.

It is often preferable to provide a degree of resilience in each of the respective mechanical coupling means to afford an increased comfort to the occupants of the vehicle, and when resilience is thus provided, it normally becomes necessary to also avoid pitch and/or roll by providing a particular form of interconnective means between the respective first mechanical coupling means and/or the respective second mechanical coupling means. Generally, due to the geometrical and mechanical advantages present in the design of conventional vehicles, it is considered more important that roll motions be restricted than pitch motions.

Where an interconnection between the two second mechanical coupling means is provided, extending in the lateral direction of the vehicle, the interconnection is constructed so that angular movement occurring in the mechanical coupling means on one side of the vehicle urges an angular movement in the opposite direction in the mechanical coupling means on the opposite side of the vehicle, preferably an equal angular movement.

Preferably each first mechanical coupling means includes respective elongate members coupled one to each laterally spaced wheel assembly to angularly move in response to the generally vertical movement of the wheel mounted thereon relative to the vehicle body. The respective elongate members of each first mechanical coupling means being coupled so said angular movement of one elongate member will urge angular movement in the opposite direction of the other elongate member of that first mechanical coupling means. Preferably the respective movements are equal.

The second mechanical coupling means is similarly constructed but is arranged with respect to the longitudinally spaced wheel assemblies.

In a preferred embodiment wherein each of the first and second mechanical coupling means include respective elongate members coupled to each wheel assembly, the respective two elongate members of each mechanical coupling means are interconnected by gear means. The gear means being arranged so angular movement of one elongate member will urge angular movement of the other elongate member in the opposite direction. The relative movements may be equal or differ to a limited degree.

With this arrangement, torsional forces in the vehicle body normally generated when axle articulation takes place are minimised.

The currently proposed suspension system also substantially equalises the loads borne by each of the wheels when a vehicle traverses undulating terrain. A typical example of this situation is when the front left wheel and the back right wheel may be positioned on higher ground than the front right and rear left wheels respectively. In conventionally sprung vehicles fitted with traditional progressive suspension systems the axle articulation thus described causes the loads to be borne principally by the two wheels on the higher ground while traction is lost at the diagonally opposite wheels located in the hollows, which become the lesser loaded wheels. This type of axle articulation frequently leads to the spinning of the lesser loaded wheels, which in turn can cause the vehicle to become stuck or dangerously positioned.

It should be appreciated that the system differentiates intrinsically between static and dynamic situations. Significant deformation of the resilient elongate members occurs only in dynamic situations when impulse forces are applied momentarily causing displacement of the relatively light wheels but not the heavier vehicle body. This behaviour is similar to conventionally suspended vehicles, but if the vehicle is stationary or moving slowly through undulating terrain, the body and the elongate members have time to move to positions where there is negligible spring deformation, thereby preventing unweighting of wheels, and thus maintaining traction.

As previously referred to in a preferred construction, each mechanical coupling means comprises two elongate members, one coupled to each of two wheel assemblies interconnected by the mechanical coupling means. The respective elongate members being interconnected so rotation of one in one direction urges rotation of the other in the opposite direction, preferably an equal degree of rotation or of a similar order. This construction results in the minimisation or prevention of changes in the spring forces at each wheel supporting the vehicle during axle articulation, hence maintaining even wheel weights and therefore traction and secondly no torsional forces are developed in the vehicle body.

In one arrangement the elongate members may be of torsion bar like construction, and arranged with the torsion bars functionally connected to the front wheels to extend backwards towards the back wheels while other torsion bars associated with the back wheels extend forwards towards the rear termination of the front torsion bars. The connection between the adjacent ends of the front and rear torsion bars may be of a gear form or a system of levers to achieve the required reversal in the direction of rotation.

Thus when one wheel (such as the front left wheel) on one side of the vehicle is forced upwards it tends to cause the linked wheel on the same side (rear left) to be thrust down with an approximately equivalent force thereby ensuring approximately equal wheel loading on all wheels in non dynamic driving contexts. The same result is achieved between the front and rear wheels on the opposite side of the vehicle and between the two front wheels and the two rear wheels.

The suspension system may also be provided with at least one lateral linkage, between the left and right hand side mechanical coupling means. One lateral link provides roll stability by connecting the torsion bars on one side of the vehicle to the torsion bars on the opposite side, so that when the two wheels on one side of the vehicle are forced up (or down) simultaneously this urges a movement of the pair of wheels on the other side of the vehicle in the same upward (or downward) direction. In this way roll stability of the vehicle is controlled without the inclusion of roll stabiliser bars which are commonly fitted to conventionally suspended vehicles, and which limit free axle articulation movements. It should be noted that this transverse linkage does not contribute to the support of the vehicle, but merely defines its roll attitude and stability without imposing a restriction on axle articulation movements.

The vehicle suspension system herein disclosed provides a vehicle supported above the terrain in the pitch direction by the front and rear lateral coupling means and supported in the roll direction by the longitudinal coupling means linking the front and rear wheels on the same sides. If, for example, the longitudinal coupling means were to be removed, the vehicle would subside towards the left or right. Similarly, if the front and rear lateral coupling means were to be removed, then the vehicle would subside. Therefore it is the combination of support in the individual lateral and longitudinal directions which provide support in all directions while still permitting unrestricted vertical wheel travel in uneven terrain and whilst substantially equalising the load borne by each wheel.

Expressed in general terms there is provided a vehicle suspension system comprising two laterally spaced forward wheel assemblies and two laterally spaced rear wheel assemblies together supporting a vehicle body, each wheel assembly including a wheel and a wheel mounting connecting the wheel to the vehicle body for movement relative to the body in the generally vertical direction, mechanical coupling means interconnecting each wheel assembly to the adjacent wheel assemblies said mechanic coupling means also being arranged to generate a movement that is a proportional average of the movement of the two wheels connected thereto, and means to selectively transfer said generated movement to the mechanical coupling means on the opposite side of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be more readily understood from the following description of one practical arrangement of the suspension system as depicted in the accompanying drawings which are given by way of illustration only, and thus are not limitative of the present invention, and wherein.

DESCRIPTION OF THE PREFERRED EMBODIMENT

Figure 1:
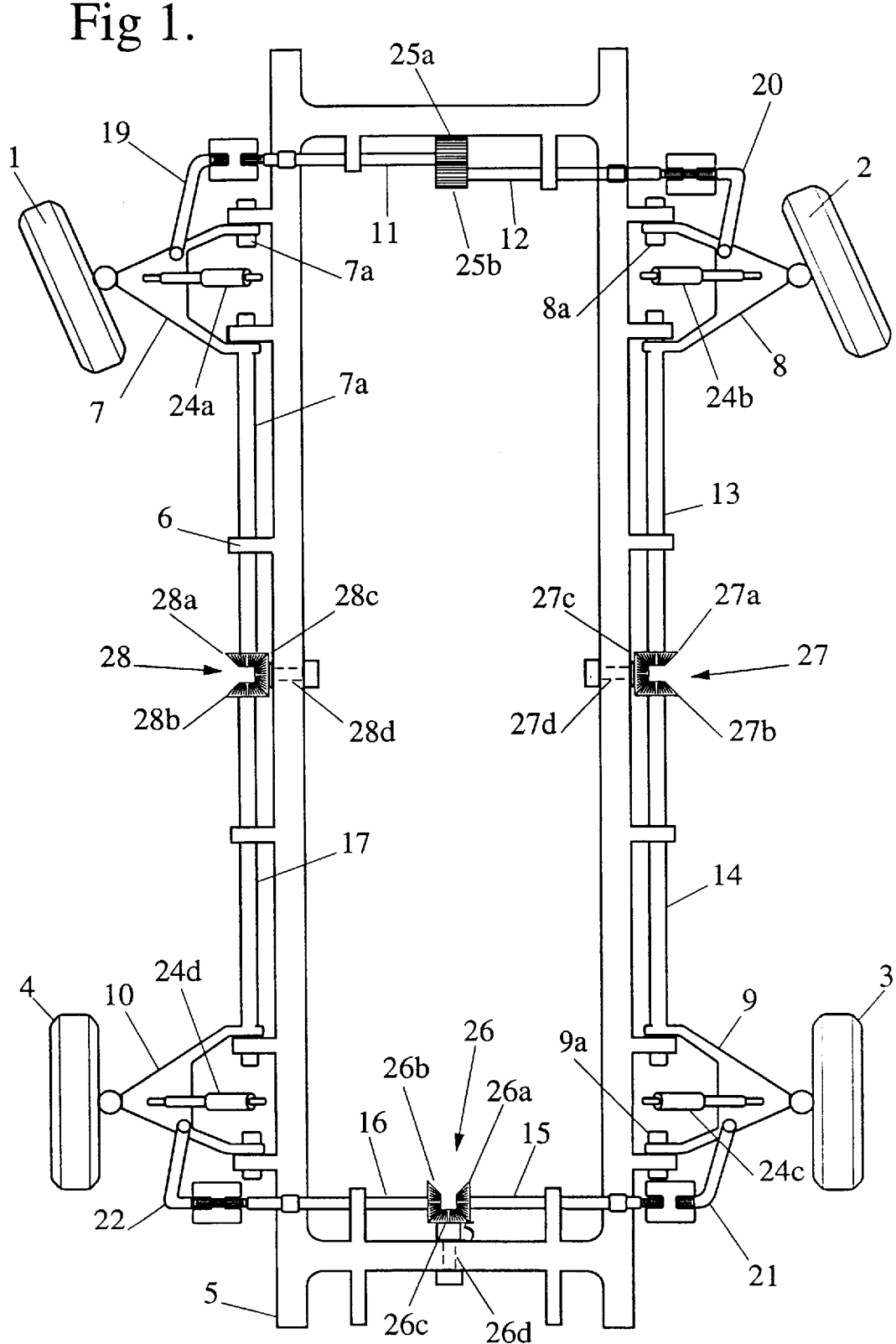
FIG. 1 is a diagrammatic plan view of one vehicle wheel and suspension layout.

In the drawings, the components of the vehicle which are not essential to the description of the invented system have been omitted.

Referring to FIGS. 1 and 2 the suspension system and vehicle are shown diagrammatically with its front of the vehicle facing the top of the page and with the front wheels turned towards the left. The front left wheel 1 the front right wheel 2, the rear right wheel 3 and rear left wheel 4 support the vehicle.

The ladder type chassis frame 5 has a series of cleats 6 on the perimeter thereof. Wishbone arms 7, 8, 9 and 10 are of a commonly known construction and are pivotally connected to the chassis 5 to permit the wheels to move in generally upward and downward directions with respect to the chassis on the pivot axes 7a, 8a, 9a and 10a respectively. A second wishbone (not shown) may also be provided to locate the wheel in the third dimension or the wheel may alternatively be located in the vertical plane by way of a shock absorber type unit such as is known in vehicles. Other wheel location constructions such as trailing arms, radius rods and similar devices, which permit the relative movements between the wheels and chassis may be used instead of the illustrated wishbone units.

The contra-rotating torsion bars 11, 12 which support the front end of the vehicle are laterally located at the front of the chassis so that torsion bar 11 is directly linked to the suspension of the front left wheel 1. Likewise torsion bar 12 is directly linked to the suspension of the front right wheel 2.

The longitudinal pair of contra-rotating torsion bars 13, 14 on the right side of the vehicle are linked to the suspension of the wheels 2 and 3. The rear lateral pair of torsion bars 15, 16 are connected to the suspension of the rear wheels 3 and 4. Finally, the left hand side pair of longitudinal torsion bars 17, 18 are connected to the left hand side wheels 4 and 1.

With reference to the front end of the vehicle, the torsion bars 11, and 12 are connected to the wishbone linkages 7 and 8 respectively by way of intermediate linkages 19, 20 respectively, which may be provided with ball joint ends which accept the changing angles between the relevant torsion bars and wishbone linkages.

Similar intermediate linkages are shown connecting the rear axle lateral torsion bars 15, 16 to the rear wishbones linkage 9, 10 respectively indicated at 21 and 22.

Any of the torsion bars linkages may be joined to the wishbone linkages (or any other wheel support linkage mechanisms) in a similar way to that described above by way of intermediate linkages, or the torsion bars may alternatively be connected to the wishbone or trailing arm or other wheel location means by way of any other convenient method. An example of this is shown with reference to the longitudinal torsion bars 13, 14, 17, 18 which are mounted so that their rotational axes are concentric or coaxial with reference to the axes of the wishbones pivots 7a, 8a, 9a, 10a so that the ends of the bars may be rigidly fixed to the associated wishbones.

At any convenient and/or advantageous location near to the ends of the respective torsion bars there are provided support means generally 6, which locate the torsion bars with reference to the chassis or vehicular body, whilst permitting the torsion bars to rotate within the support means. The support means may typically be provided with needle roller bearings or brass bushes which permit free rotational movement of the torsion bars.

It may be advantageous in some contexts to provide rubber bushings instead of bearings, so as to introduce some damping effect between the torsion bars and the chassis in a similar way to the damping provided by telescopic dampers or other components commonly known as shock absorbers. Alternatively, shock absorbers, may be provided between any of the torsion bars and the chassis or between two adjacent torsion bars. An advantage arising from positioning the shock absorbers or dampers at different points along the lengths of the different torsion bars is to permit the vehicle to be tuned with individual roll and pitch damping characteristics to enhance ride and handling as seen appropriate for each vehicle type. Therefore dampers or shock absorbers located on the longitudinal torsion bars will define the extent of roll damping while those on the lateral torsion bars limit pitch resonance. The distance along the torsion bar members from the anchorage to the wheel suspension to the damper or shock absorber defines how much undamped springing or resilience is available in the torsion bar. Thus there is permitted a wider range of turnability than in conventional shock absorber systems.

Alternatively, it may be convenient and easier to package the shock absorbers into the conventionally available spaces in the vehicle wheel arch area, and therefore provide conventional telescopic dampers as indicated at 24a, 24b, 24c and 24d respectively.

As previously indicated, the torsion bars linking orthogonal wheels are connected so as to contra-rotate at the juncture thereof. In the case of the front lateral pair of torsion bars 11, 12, these are shown in the FIGS. 1 and 2 terminating in a slightly overlapping relation near a central point between the wheel. The individual torsion bars are provided with respective gear teeth formations 25a, 25b in the area of overlap which inter-mesh and thereby ensure contra-rotational movement of the two torsion bars 11, 12 at this point. The extent of contra-rotation is defined by the extent of the wheel articulation taking place (which does not require spring resilience) as opposed to the amount of wheel travel arising out of the impacting of two orthogonally adjacent wheels simultaneously with a bump which causes the torsion bars to twist along their lengths to provide a degree of springing.

An alternative arrangement to provide the contra-rotational is shown at the rear axle lateral torsion bars 15 and 16 in FIGS. 1 and 2. In this example, the two torsion bars are mounted on the same axis each provided with a bevel gear 26a, and 26b facing each other. In between the two bevel gears, a third bevel gear 26c is located which meshes with both gears 26a and 26b. The intermediate or third bevel gear 26c is rotatably mounted on a fixed axis in the chassis or body 5 by the spigot 26d so as to provide easy relative contra-rotational movement of the two torsion bars 15 and 16.

Figure 2A:
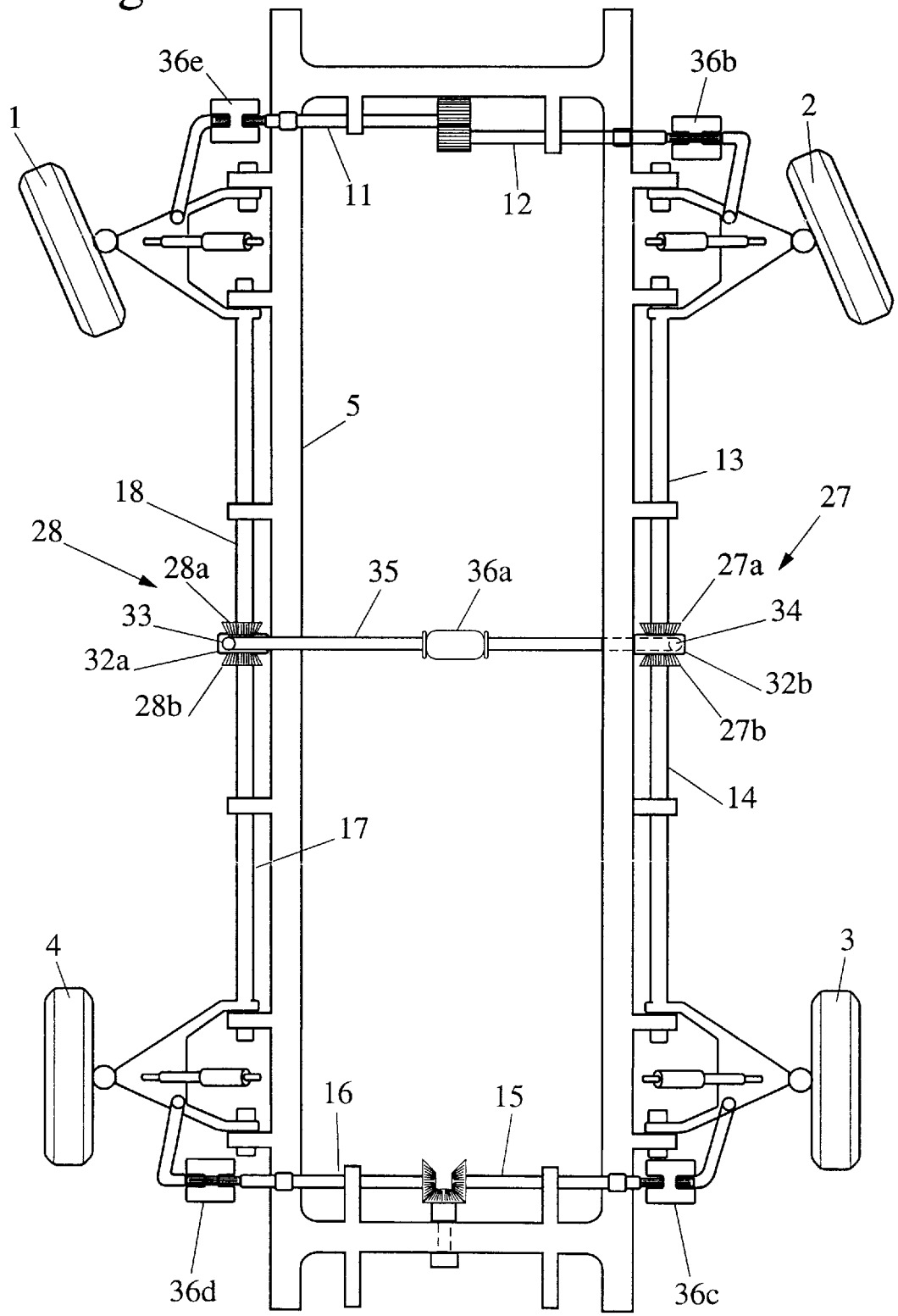
FIG. 2A is a diagrammatic plan view of a variation of the vehicle suspension shown in FIG. 1.

The contra-rotational components between the two longitudinal pairs of torsion bars 13, 14, and 17, 18 are similar to that at the rear of the vehicle and as described above, in that the two torsion bars of each pair terminate in an opposing relation and are provided with respective opposing bevel gears 27a, 27b and 28a, 28b respectively. The opposing gears 29, 30 each mesh with a third bevel gear 27c, 28c respectively rotatably mounted in the body 5 as previously described with reference to the bevel gear 26c mounted at the rear of the body. However, as shown in FIG. 2 and FIG. 3, the three gears 31 are mounted on a carrier ring 33 and 34 which can itself rotate on a longitudinal axis. The respective longitudinal side mounted contra-rotational assemblies 27, 28 as seen in FIG. 2 are structurally similar to a differential gear units as commonly found in the drive train of vehicles and these components will now be described with reference to FIG. 4.

It should be noted that although full circle gears or toothed contra-rotational devices are generally illustrated in the drawings the same contra-rotational motion of the respective torsion bars may be achieved by segments of bevel and ring gears as in use these components only need rotate through a maximum of about 45 degrees in each direction from a central position. Alternatively bevel and other types of geared components may be replaced by lever arms which are flexibly connected (by way of ball joints or other components such as bushings) arranged such that as one torsion bar turns in one direction, the adjacent torsion bar turns in the opposite direction as will be seen in the further description of the operation of the transverse central member 35 linking contra-rotating assemblies 27 and 28.

Referring to diagrams A and B of FIG. 3 there is shown an elevation view through the suspension in the plane of the gear systems 27, 28, as seen from the rear of the vehicle.

The central contra-rotational gear system drivably link the front left and rear left hand wheels by way of torsion bars 17 and 18. These torsion bars terminate in bevel gears 28b and 28a. It should be understood that any number of bevel gears 31 may be incorporated.

The bevel gears 31 mesh with bevel gears 28a, 28b and 27a and 27b and are conveniently rotatably housed on spigots located in an outer ring member 32a and 32b that they effect the relative contra-rotational movements of the two torsion bars 17, 18 during diagonally opposite wheel articulations. Additionally, if both torsion bars move in the same direction such as if the side of the vehicle is changing height at both wheels on one side then the ring housing 32 will itself rotate with respect to the chassis.

Referring further to diagram B in FIG. 3, each ring housing 32a and 32b is additionally equipped with a cleat or ball joint 33 and 34 which provides a flexible anchorage for a rigid bar 35 which interconnects the two ring housings. The central transverse bar 35 is similar in construction, and has similar termination components at 33, 34, to a conventional Panhard rod, commonly used in vehicle suspensions, although its function in this instance is entirely different.

It will be noted that the central transverse bar 35 is connected to the cleat 33 located on the upper portion of the ring housing 32a associated with the left hand side longitudinal torsion bars, and on the cleat 34 on the underside of the ring housing 32b, on the right side of the vehicle. Therefore, if the two wheels on the right side of the vehicle are moved upwards with reference to the chassis, such as in consequence to the vehicle turning to the left as shown in FIG. 1, then the two torsion bars 13, 14 will turn in an anti clockwise direction, and while this will not cause the bevel gears 31 to turn it will cause the entire outer housing ring assembly 32b to turn in an anti clockwise direction as seen in diagram B in FIG. 3b. The central connecting rod 35 will therefore be pulled towards the right side of the vehicle, and since it is connected to the upper portion of the ring housing at 33, it will cause the left ring housing 32a to rotate in a clockwise direction. This then in turn urges the left wheels to be moved upwards which has the effect of lowering the left side of the vehicle as a consequence the roll angle of the vehicle, caused by the cornering motion of the vehicle, is reduced.

Significant forces are only generated in the longitudinal torsion bars and respective connections when the vehicle is experiencing lateral roll movement.

A roll attitude adjusting component 36a is shown in the centre of the transverse rod 35. The function of this component is to provide a mechanism which can alter the attitude of the vehicle about the roll axis to compensate for wheel displacements caused by, for example, load changes on the longitudinal torsion bars due to the roll moments produced during cornering. Typically, the roll attitude adjuster component 36a comprises a housing which can rotate with reference to the link 35 and can be similar in construction to devices commonly known as screw jacks or turn buckles. The rod 35 is normally discontinuous with a gap between the adjacent ends. The adjacent free ends so formed are threaded in opposite senses and the roll attitude adjusting housing cylinder 36a is provided with similar appropriate internal threads to engage the threads on the rod ends.

When the housing cylinder 36a is turned, this causes the overall length of the rod 35 to be increased or decreased depending upon which way the cylinder 36a is turned relative to the rods 35. If the overall length of the rod 35, is reduced then the left side of the vehicle will be lowered and the right side will be raised, thereby leaning the vehicle to the left. If the length is increased then the left side of the vehicle will be raised and the right side will be lowered, thereby leaning the vehicle to the right. Active versions of the proposed suspension system can therefore be constructed, incorporating the above mechanism, to reduce, negate or even reverse vehicle roll. The rod length being appropriately adjusted by rotating the housing 36a which can be effected electrically, hydraulically or mechanically according to known ways and from remote locations. This can be effected by an electronic control mechanism which receives a signal indicating the required attitude of the vehicle body and a programme to effect adjustment of the housing cylinder position as required.

While the inclusion of the roll attitude adjuster 36a raises or lowers one side of the vehicle in relation to the other, it is unable to directly adjust the height and level attitude of the entire vehicle. In the context of commercial vehicles, which are subject to large load weight changes resulting from cargo being introduced or removed, it is sometimes useful to include one or more height or attitude adjustment devices in the rear (or front, or side) torsion bars. Typically the height and attitude control could be incorporated in any of the torsion bars and would consist of a component 36b, 36c, 36d and 36e shown in FIG. 2a usually located at one end of at least one torsion bar which can rotate the bar to tighten or relax depending on whether there was a requirement for additional height or otherwise. The turning adjustments can be driven electrically, hydraulically or mechanically under manual or electronic control to adjust and trim the vehicle height according to the requirements at any given time. Various kinds of adjustment means are typically seen in vehicles fitted with conventional torsion bars, although these are not normally powered for height changes. An alternative method of effecting height and attitude changes is to locate a component similar in construction to the roll attitude adjuster 36a in the appropriate linking such as links 19, 20, 21, 22 which effectively lengthens or shortens these linkages thereby changing the height and/or attitude of the vehicle.

Figure 2B:
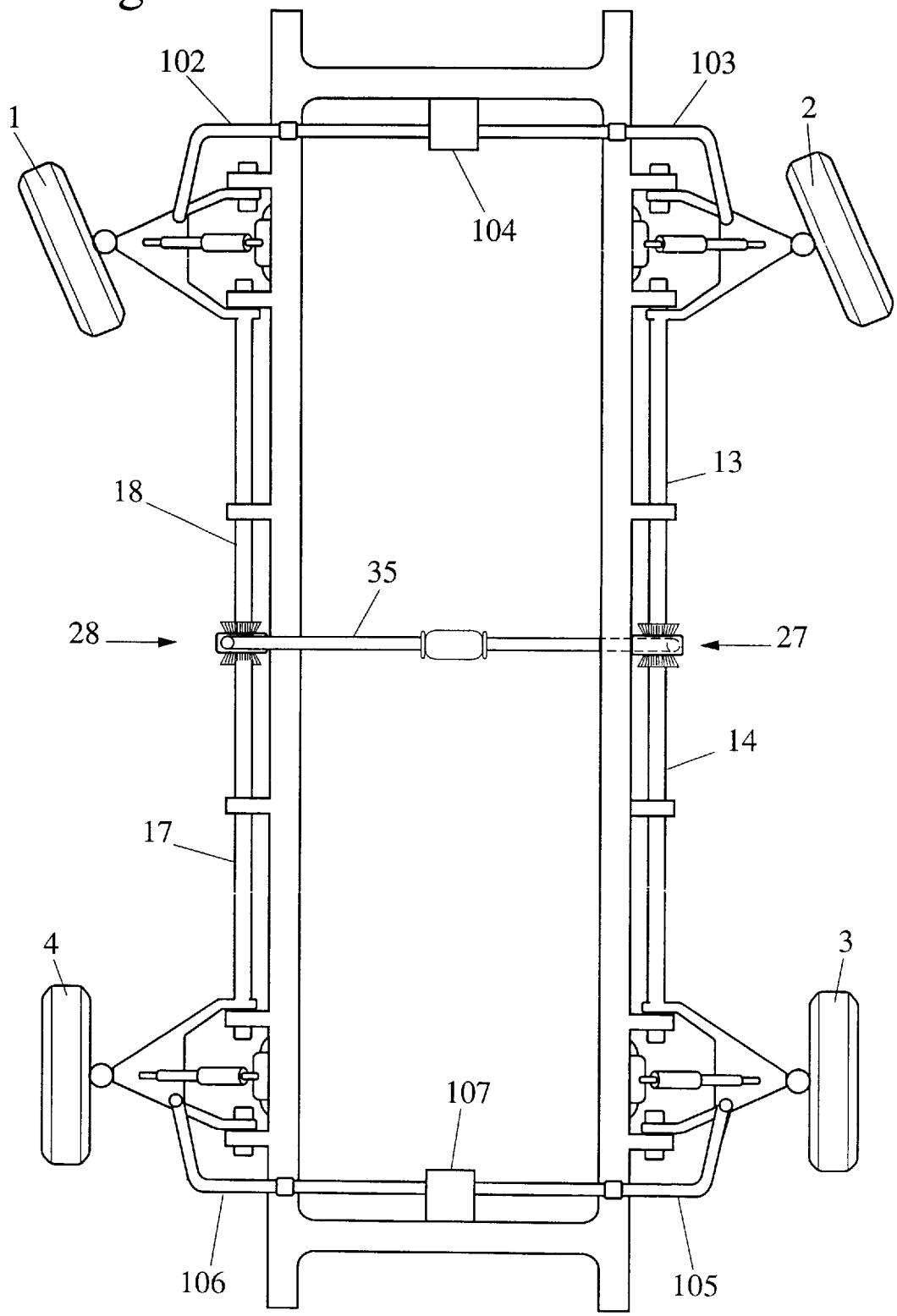
FIG. 2B is a diagrammatic plan view of an alternative vehicle suspension system wherein each wheel is supported by a respective spring means.
Figure 3:
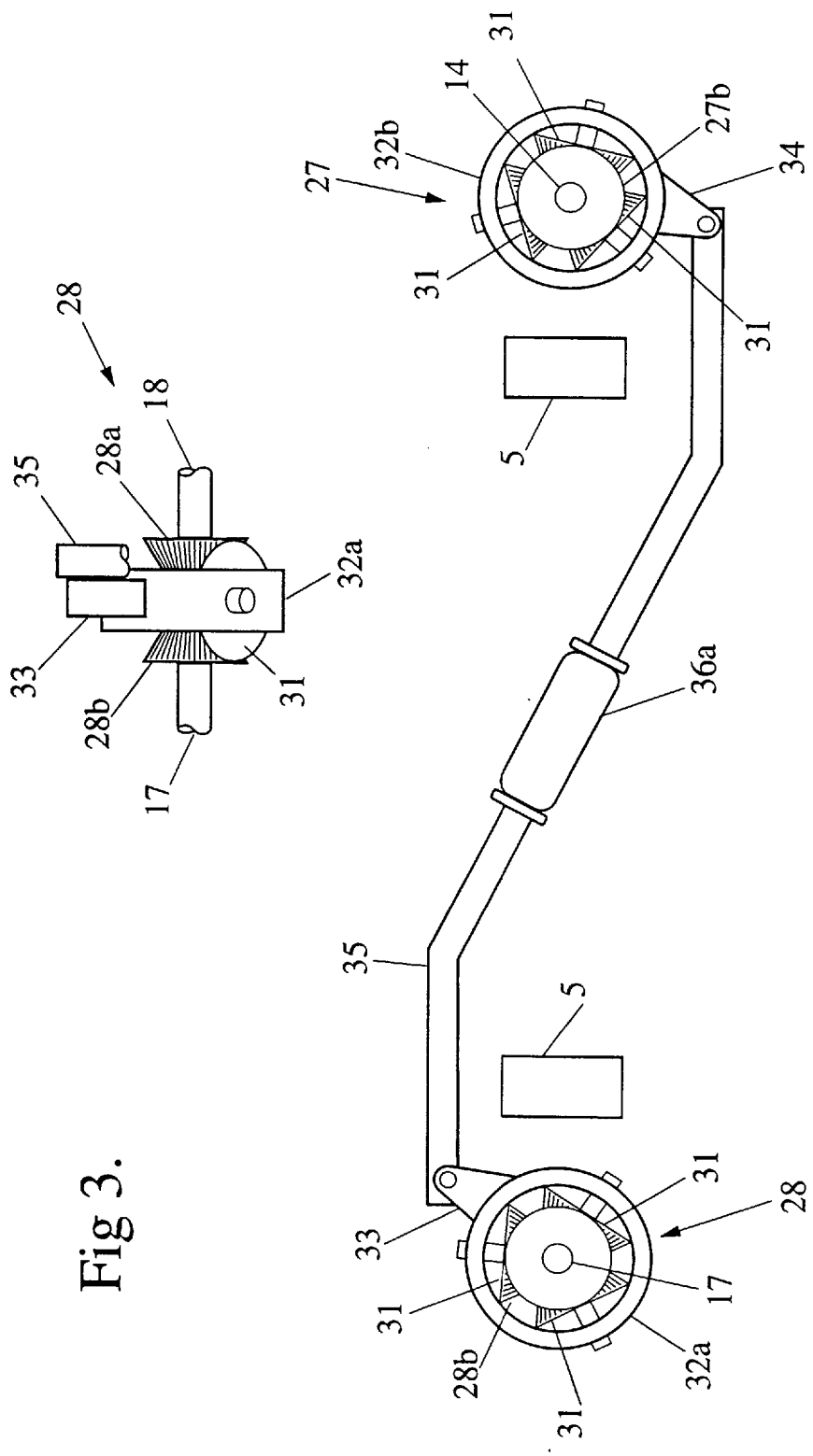
FIG. 3 is a detailed view of the lateral connection mechanism between the suspension mechanism on the opposite sides of the vehicle as shown in FIG. 2.

Referring now to FIG. 2B of the drawings, there is depicted a further modification of the suspension system previously described. In this system, the chassis 5 and the wheels 1, 2, 3 and 4 are of the same construction and are relatively arranged as previously discussed with the respective wheels being connected to the chassis 5 by wishbone configurations 7, 8, 9 and 10. The transfer of load between the respective wheels and the chassis 5 are carried out by individual torsion bar members 102, 103, 105 and 106 connected between the respective wishbone assemblies and the body with each torsion bar being individually anchored to the body, such as to the anchor blocks 104 and 107 respectively. In this way, the weight of the chassis and load carried thereby is transferred directly from the chassis to each of the wheels independently, thus, resolving the forces developed in the respective torsion bars directly and individually into the vehicle chassis 5.

In addition, torsion bars 13, 14, 17 and 18 are provided and individually mounted in the same manner as previously described with respect to FIG. 1 and FIG. 2A, with the torsion bars 17 and 18 being interconnected by the gear unit 28 and the torsion bars 13 and 14 interconnected by a gear unit. The construction and interconnection of the respective torsion bars with the gear units 27 and 28 is identical to that previously described with reference to FIG. 2A and shall not be described in more detail here. Similarly, the gear assemblies 27 and 28 are interconnected by a linkage system 116 which is again of identical construction to that previously described with respect to FIG. 2A and 3 of the drawings.

In the construction above described with respect to FIG. 2B, the torsion bars 102, 103, 105 and 106 may be of any known form provided the forces are resolved directly into the vehicle body and not transferred from one wheel to the other. Further, these torsion bars provide the necessary support for the weight of the vehicle and provide bounce and pitch resilience to the vehicle. The longitudinal torsion bars 13, 14, 17 and 18 provide the resistance to body roll while resistance to axle articulation is only derived by the front and rear individual torsion bars and not the roll control torsion bars 13, 14, 17 and 18, thus resulting in a smaller variation in wheel loading during articulation compared to that of a standard vehicle with conventional stabiliser bars.

Figure 4:
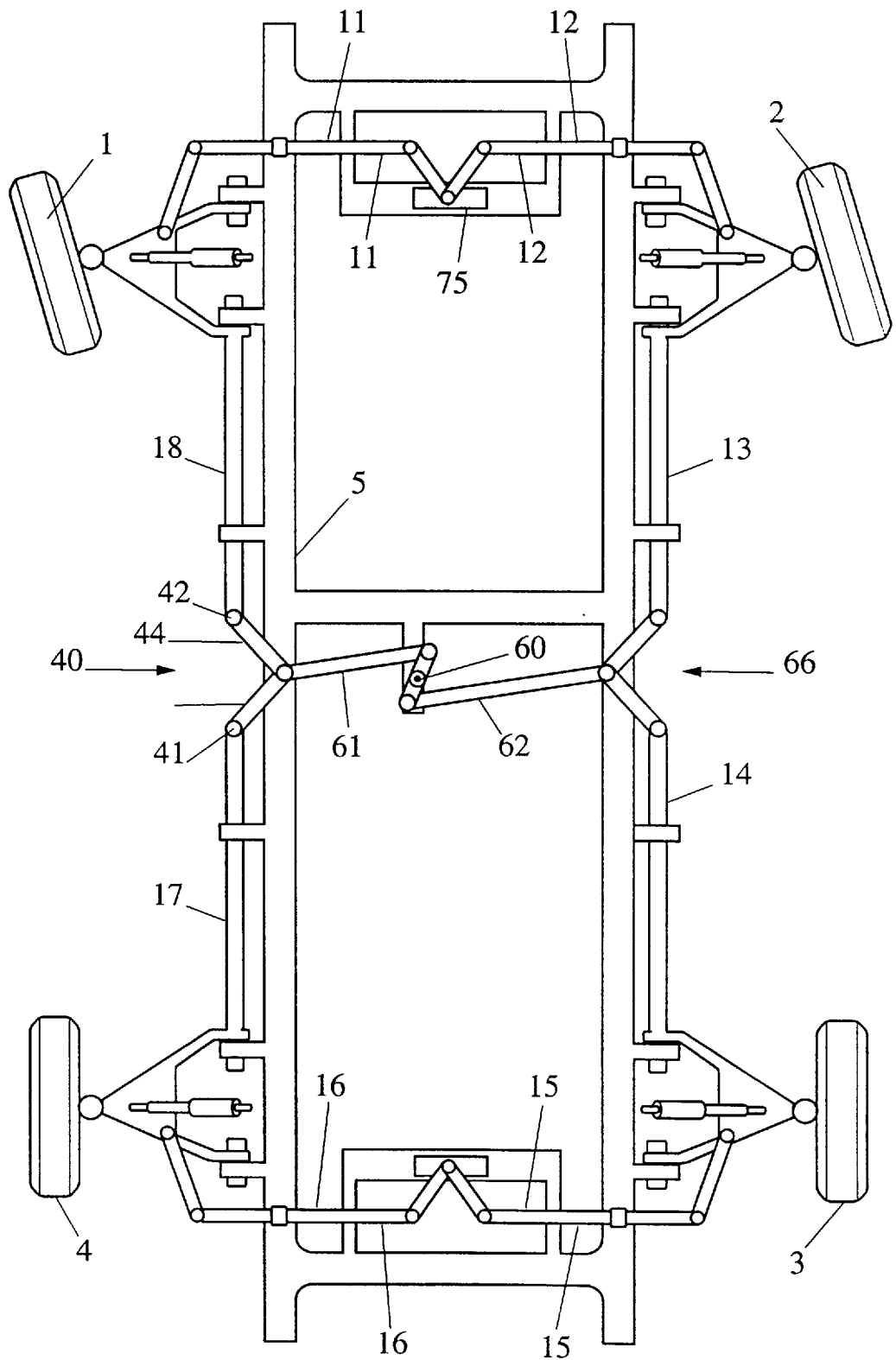
FIG. 4 is a diagrammatic view of a suspension system similar to that shown in FIG. 2 with an alternative form of cross connection between the suspension mechanisms on opposite sides of the vehicle.

Referring to FIG. 4 of the drawings wherein there is depicted an alternative form of interconnection between the respective torsion bars extending laterally and longitudinally of the vehicle chassis. The construction and layout of the basic chassis and the respective wheels and associated wishbone suspension system are the same as that previously described with reference to FIG. 1, and where appropriate, the same reference numerals have been applied in FIG. 4 but the general description of the arrangement of these components will not be repeated herein with respect to FIG. 4. The difference in the mechanism as shown in FIG. 4 relates to the interconnection between the respective torsion bars which in FIG. 2A is based on a arrangement of gears that are replaced in the embodiment shown in FIG. 4 by a mechanical linkage system which will be now described in detail.

Figure 5:
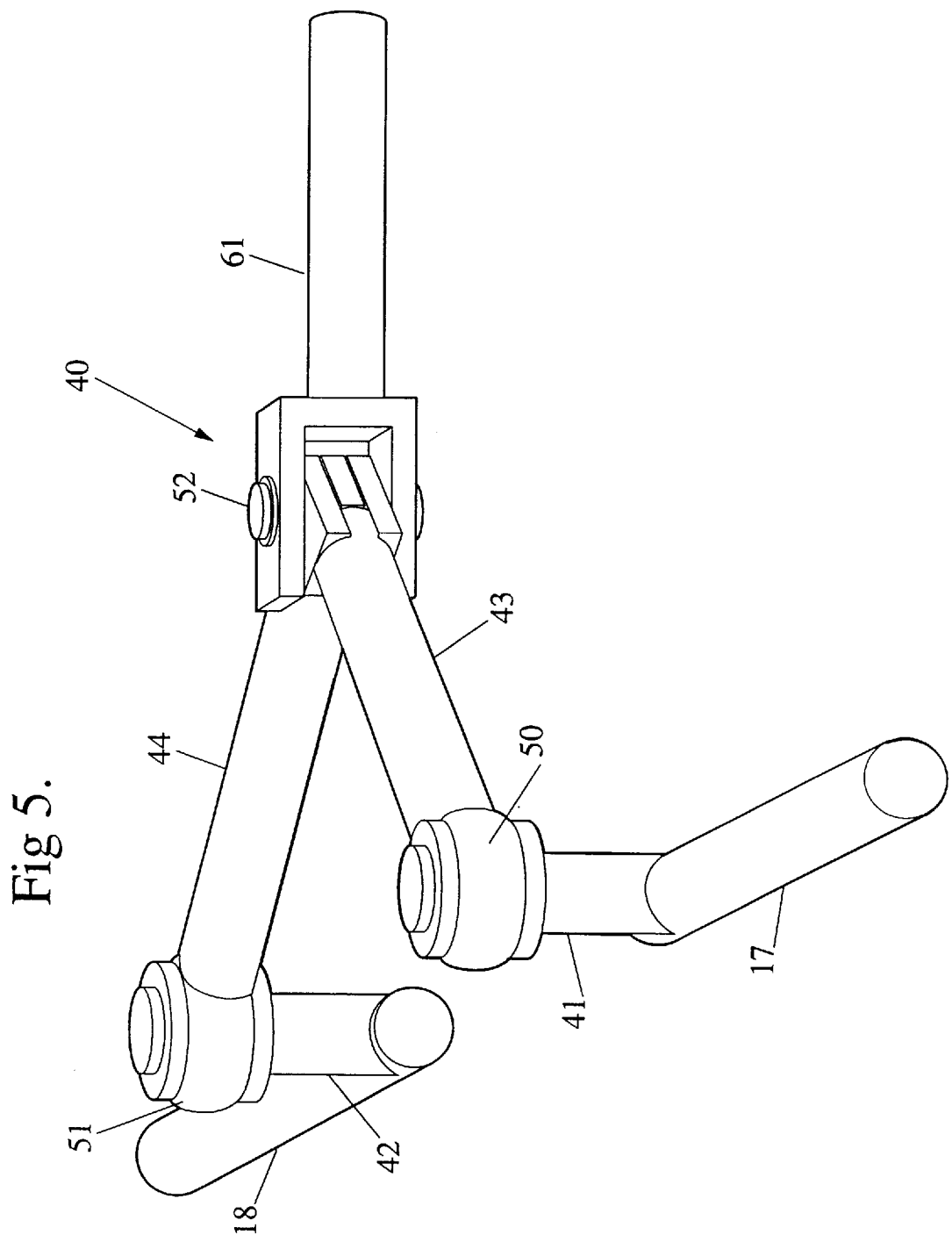
FIG. 5 is a detailed drawing of part of the mechanism shown in FIG. 4.

As seen in FIG. 5 which is an enlarged view of portion of the torsion bars 17 and 18, and the alternative interconnecting mechanism 40. The respective torsion bars 17 and 18 are provided with a rigid vertically projecting stubs 41 and 42 respectively, each of which is connected, with an end of the respective arm 43 and 44. The connection between the respective stubs and the arms are by way of a conventional ball and socket connection 50 and 51 to allow relative rotation therebetween and/or relative tilting or angular displacement. The other end of each of the arms 43 and 44 are pivotly connected to the end of the rod 61 by the pivot pin 52.

The above construction operates such that, if the torsion bar 18 were to rotate in the clockwise direction, as a result of an upward movement of the front wheel 1 with respect of the chassis 5, then the stub 42 would similarly rotate in a clockwise direction thereby causing the arm 44 to push on the rod 61 to tend to align the arm 43 with the rod 61. This in turn will push on the arm 43 and rotate the torsion bar 17 in an anticlockwise direction. Thus it will be seen that the link mechanism as shown in FIGS. 4 and 5 produces the same effect as the bevel gear assembly described with respect to the rear lateral mechanical coupling means in FIG. 1.

This suspension system as described with reference to FIGS. 4 and 5 allows the transverse torsion bars at the front and rear of the vehicle to counter rotate freely, as in vehicle body roll and axle articulation, but effectively prevents the motion of the central connection of the transverse torsion bars when a parallel motion of the wheels, as in bounce or pitch, occurs. In this way the front and rear transverse torsion bars support the load of the vehicle and provide resistance to bounce and pitch motions only.

Neither the, longitudinal or transverse torsion bar systems, provide any axle articulation resistance resulting in a constant wheel loading during articulation. As both the transverse and longitudinal systems are totally independent in their operation it is possible to tune the vehicle independently for roll, pitch and bounce resistance.

Referring to FIG. 4, the central pivot mounted link 60 is connected at one end to the link 61 which is connected to the mechanism 40 detailed in FIG. 5. The other end of link 60 is connected to link 62 which is connected to the mechanism 66 which is the same as mechanism 40 in function and construction previously described.

When the wheels on the left hand side of the vehicle are lowered relative to the body, as when the vehicle turns to the left, the stubs 41 and 42 on the ends of torsion bars 17 and 18 move left which in turn move the links 43 and 44 left and thereby displacing the link 61 to the left as well. This motion is reversed by link 60 to move link 62 to the right and the corresponding links and stubs of mechanism 66 to the right. This results in a lowering of the wheels on the right hand side of the vehicle and therefore a resistance to roll of the body. The torsional stiffness of the torsion bars 13, 14, 17 and 18 influencing the amount of roll.

In the case when wheel 1 is raised relative to the body and wheel 4 is lowered relative to the body the stub 42 moves right and stub 41 moves left. This forces the common end of links 43 and 44 to move towards the rear of the vehicle and not change the lateral position of link 61. No significant forces are generated in the longitudinal torsion bars. In this way the above described mechanism only provides resistance to roll motions of the body relative to the wheels.

FIG. 4 also shows a mechanism s as previously described with reference to FIG. 5 used as the connecting means for the transverse torsion bars connecting the two front wheels and as the connecting means for the transverse torsion bars connecting the two rear wheels. Its operation is similar to that of the mechanism 40 described above except that the motion of pivot pin 52 shown in FIG. 5 is constrained to one in the lateral direction by the slot 75 respectively.

Figure 6:
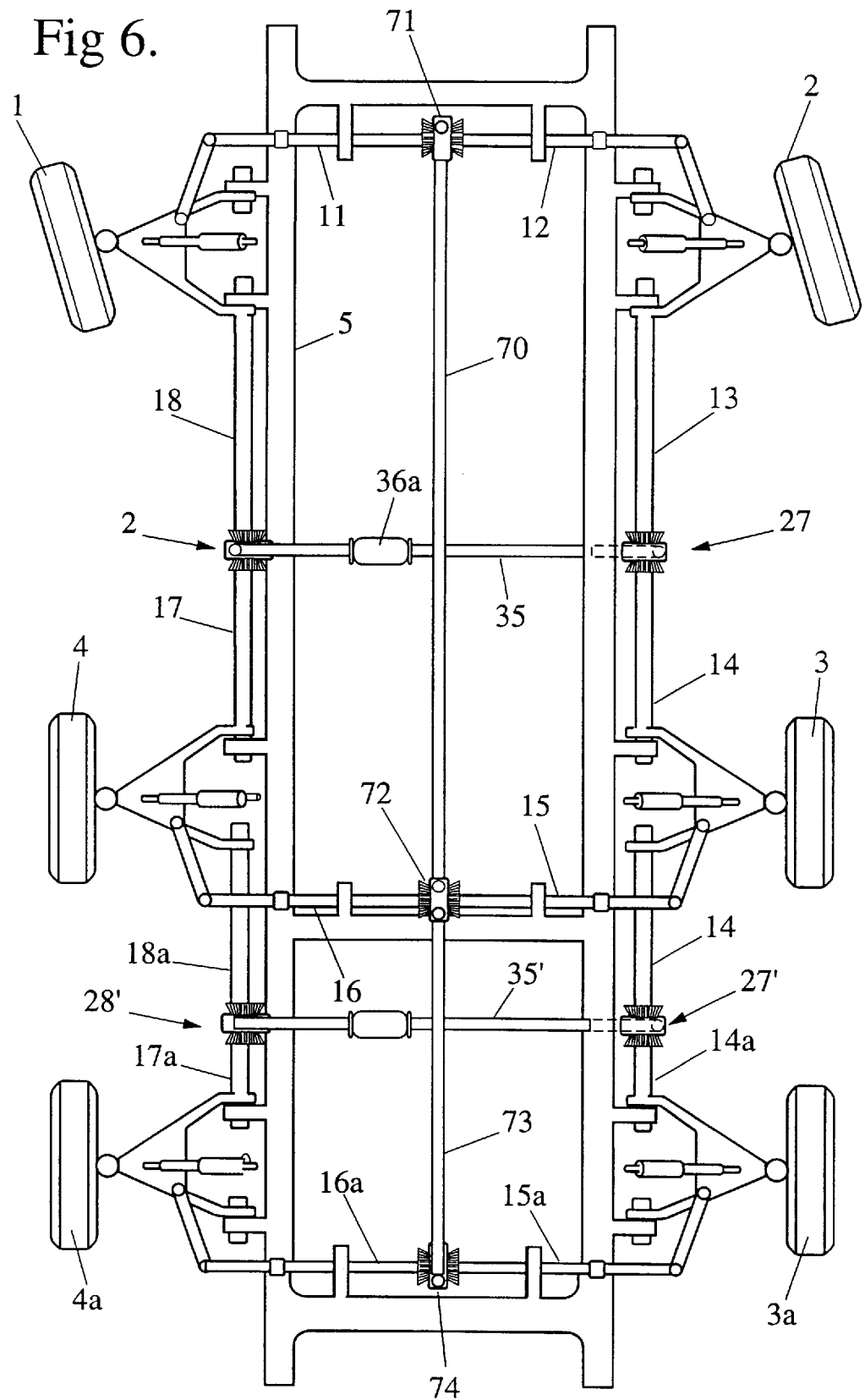
FIG. 6 is a diagrammatic plan view of a suspension system of a six wheeled vehicle.

Referring now to FIG. 6 of the drawing there is depicted therein a vehicle body and suspension system with the individual components thereof represented in the same manner as described previously with respect to FIG. 2. However in this vehicle there are three longitudinally spaced axial assemblies providing a six wheeled vehicle, as compared with the more conventional four wheeled vehicle. In FIG. 6 the front of the vehicle is represented at the upper end of the page with the steerable front wheels inclined to the left, being the position occupied for the vehicle to make a left hand turn.

The front wheels 1 and 2 and the suspension system connecting same to the chassis 5 is identical to that previously described with respect of FIG. 2A and have the same reference numerals applied thereto, however, for simplicity the detailed description thereof will not be repeated but reference may be made to that previous description in respect of FIG. 2A of the drawings. Also, the intermediate pair of wheels 3 and 4 in FIG. 7 correspond to the rear wheels 3 and 4 as previously described with reference to FIG. 2 and the suspension systems thereof are also the same as previously described. Further, the rear set of wheels 3a, 4a in FIG. 6 and the respective suspension systems are the same as the intermediate wheels and suspension and as that previously described with reference to rear wheels 3 and 4 in FIG. 2A and again will not be further described in detail.

The arrangement and interaction of the torsion bars extending in the longitudinal direction between the front the intermediate wheels is the same as previously described with respect of the front and rear wheels in relation to FIG. 2A. Also the arrangement of the longitudinal torsion bars between the intermediate wheels and the rear wheels of the six wheels vehicle are as previously described with reference to the front and rear wheels in FIG. 2A. Further the arrangement of bevel gear trains between the torsion bars 17a and 18a and between 13a and 14a are constructed and operates in the identical manner to that previously described with respect of FIG. 2A.

However the mechanisms interconnecting the front wheel transverse torsion bars 11 and 12 as shown in FIG. 6 is not the same as that previously shown in respect of FIG. 2A, however it is the same as that previously described with respect to the interconnecting of the longitudinal torsion bar members as shown in FIG. 2A. This mechanism is also used in interconnecting the intermediate transverse torsion bar 15, 16 and is also used in interconnecting the transverse torsion bars 15a, 16a of the rear wheel assemblies.

It is to be noted however, that in contrast to the previous description with respect to FIG. 2 the bevel gear assemblies previously employed in respect of the longitudinally extending torsion bars are now incorporated to provide the interconnection between each of the front intermediate, and rear transverse torsion bar assemblies 71, 72 and 74 respectively. Also, in the embodiment shown in FIG. 6, there is a transfer rod 70 interconnecting the gear assembly 71 of the front wheels with the gear assembly 72 of the intermediate wheel assembly, and a further transfer rod 73 interconnecting the transverse gear assembly 72 of the intermediate wheels with the transverse gear assembly 74 of the of the rear wheel assembly.

The function and operation of such transfer rods interconnecting the respective gear assemblies has previously been described with respect to FIG. 2A and the same function is performed when applied to the six wheel vehicle. However it will be recalled, as previously described, the transfer bar interconnecting the gear assemblies 32a and 32b as shown in FIG. 3 are arranged so that they are connected to the upper side of the gear assembly on one side of the vehicle and the lower side of the assembly on the opposite side of the vehicle. Thus the transfer rod 70 extending between the transverse front gear assembly 71 and the transverse intermediate gear assembly 72, connects the top of the gear assembly 71 at the front of the vehicle to the top of the gear assembly 72 of the intermediate wheel assembly. However the transfer rod 73 extending from the transverse gear assembly 72, on the intermediate wheel assembly, to the gear assembly 74 on the rear wheel assembly, extends from the underside of the intermediate gear assembly 72 to the top of the rear gear assembly 74 at the rear wheel assembly.

Figure 8:
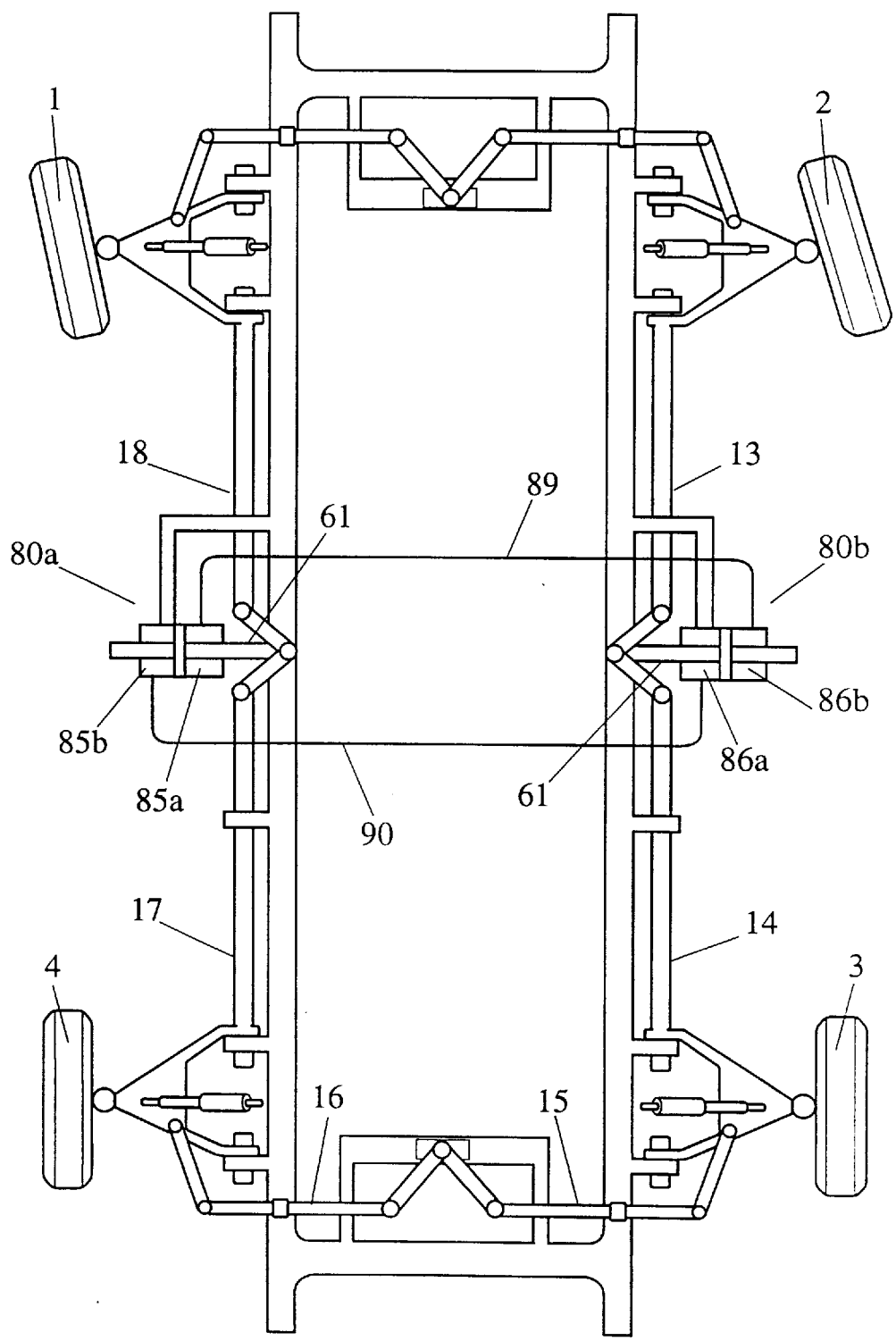
FIG. 8 is a diagrammatic plan view of a modified form of the suspension system shown in FIG. 4.

In the construction shown in FIG. 8, the basic layout of the vehicle chassis and suspension is as has previously been described with respect to FIG. 4 of the drawings, with the change that the mechanical link between the longitudinal torsion bars on either side of the chassis is now in the form of a hydraulic link.

In the construction shown in FIG. 8, each of the arms 61 previously described with respect to FIG. 5, are extended to pass through a double acting hydraulic cylinder unit 80a, 80b with a piston mounted on the arm 61 to move in unison therewith. The arm 61 extends through each end of the cylinder 80a, 80b so that the effective area of the piston 86a, 86b exposed to fluid on either side is equal.

The two laterally spaced double acting cylinders 80a and 80b have respective chambers, 85a and 85b and 86a and 86b arranged so that the inner chamber 85a of the left hand double acting cylinder 80a is connected to the outer chamber 86b of the right hand cylinder 80b, similarly the inner chamber 86a of the right hand cylinder is connected to the outer cylinder 85b of the left hand cylinder. These hydraulic interconnections being made by conduits 89 and 90 respectively.

Thus, as previously described with reference to FIG. 3 of the drawings, when the vehicle is turning to the left at a reasonable road speed, the vehicle chassis will tend to roll towards the right hand side causing a twisting action of both the torsion bars 13 and 14, so as to move the piston in the right hand cylinder 80b towards the left and the resulting fluid displacement will cause the piston in the left hand cylinder 80a to move to the right. Thus there is a load applied to the torsion bars 17 and 18 which will also lower the left hand side of the vehicle thus, controlling and substantially eliminating roll of the vehicle chassis during cornering operations.

Figure 9:
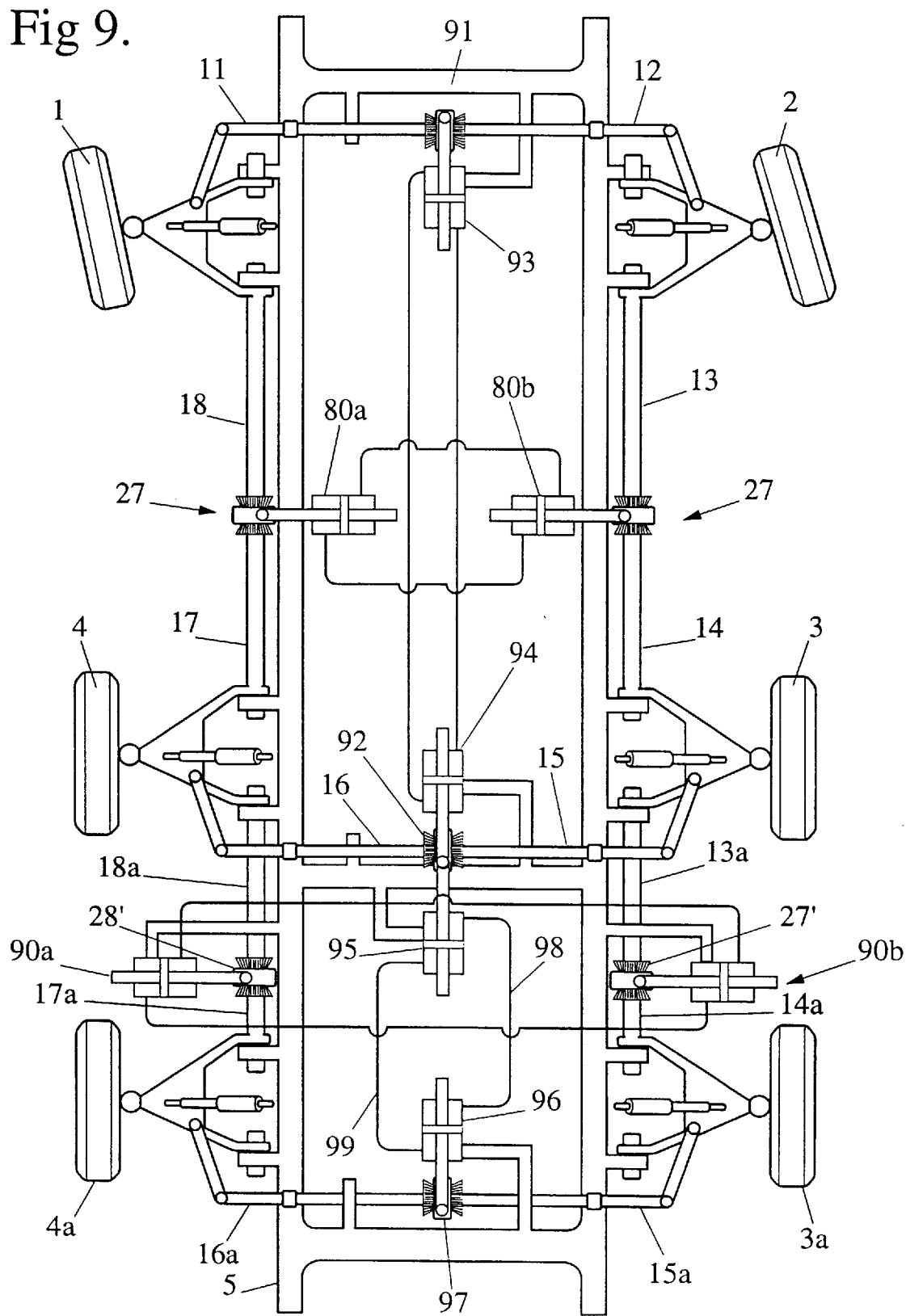
FIG. 9 is a diagrammatic plan view of a modified form of the suspension system shown in FIG. 6.

FIG. 9 is a variation on the six wheel vehicle construction as previously described with respect to FIG. 7 and has been modified to operate using hydraulic cylinders in the same manner as previously described with reference to FIG. 8. In FIG. 9, the hydraulic cylinders 80a and 80b are constructed and interconnected to operate in the same manner as they did in FIG. 8. Also, the additional hydraulic cylinders 90a and 90b cooperate with gear assemblies $28^1$ and $27^1$ are also arranged to function the same as cylinders 80a and 80b in FIG. 8.

However, in the construction shown in FIG. 9, further double acting hydraulic cylinders are provided to interconnect the gear units 91 and 92 which function the same as the gear units 71 and 72 in FIG. 6. However, in this application, the double acting hydraulic cylinders 93 and 94 are interconnected to move in unison in the same direction, thus function the same as the link 70 in FIG. 6.

Further, the hydraulic cylinders 95 and 96 associated with the gear units 92 and 97 are interconnected by the lines 98 and 99 to move in opposite directions so that they induce the gear units 72 and 74 to rotate in opposite directions. Thus, it is seen that the cylinders 95 and 96 and lines 98 and 99 function the same as the rod 73 in FIG. 6.

The suspension system of the six wheeled vehicle as previously described herein, enables driving ground engagement to be maintained between all six wheels and the ground being traversed substantially irrespective of the degree and direction of undulation of the ground surface. As will be appreciated, six wheeled vehicles are particularly constructed for carrying relatively heavy loads in off road situations where a substantially high degree of articulation of the respective wheels is required without the loss of traction between any of the wheels. This problem is particularly prevalent in currently known six wheel drive vehicles where ground contact of at least some of the wheels frequently arises when traversing severely undulating terrain and the resulting increase in load carried by the wheels remaining in contact with the ground can lead to bogging the vehicle where the ground surface is sandy, powdery or wet.

Figure 7:
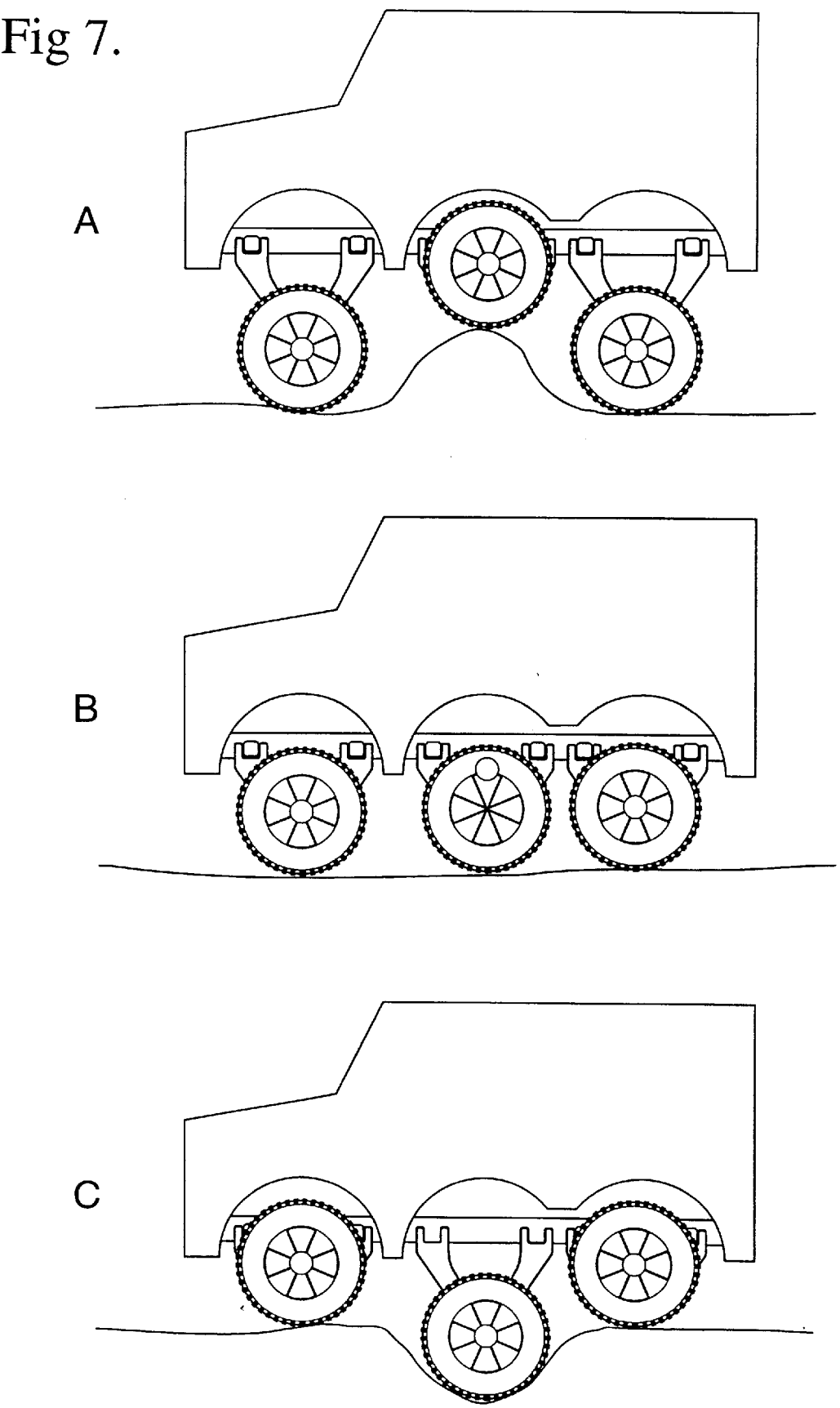
FIG. 7 is a diagrammatic side elevation of longitudinal articulation of a six wheel drive.

Referring now to FIG. 7 of the drawings, the representation B of the vehicle represents the traversing of a lowly undulating surface wherein difficulty is not particularly experienced in maintaining ground contact of all wheels. However, it must be appreciated that in some terrains, it is possible for the wheels on one side of the vehicle to be as shown in representation B, but the wheels on the other side of the vehicle may be traversing a severely undulating surface such as shown in representation A and C.

The load distribution and sharing which is achieved with the suspension system as herein described with reference to FIGS. 6 and 9, enables all six wheels to be maintained in ground contact with the load of the vehicle being distributed between all six wheels to thereby maintain traction and reduce or eliminate the risk of bogging of the vehicle due to some of the vehicles losing load induced contact with the ground.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A vehicle suspension system comprising one pair of laterally spaced forward wheel assemblies and one pair of laterally spaced rear wheel assemblies together supporting a vehicle body, each wheel assembly including a wheel and a wheel mounting connecting the wheel to the vehicle body for movement in a generally vertical direction with respect to the body;
respective first mechanical coupling means interconnecting the forward pair of wheel assemblies and interconnecting the rear pair of wheel assemblies, second mechanical coupling means respectively interconnecting longitudinally adjacent pairs of said wheel assemblies on each side of the vehicle;
said first and second mechanical coupling means being adapted to effect in response to movement of a said wheel assembly in the generally vertical direction a movement of the other wheel assemblies connected to said wheel assembly by one of the first and one of the second mechanical coupling means in a substantially opposite direction relative thereto, each said second mechanical coupling means also being arranged to generate a movement substantially proportional to the average movement of the two wheels connected thereto on one side of the vehicle; and
transfer means provided to transfer said generated movement of one second mechanical coupling means to the other second mechanical coupling means on the opposite side of the vehicle, said transfer means also being adapted to transfer forces between the second mechanical coupling means on one side of the vehicle and the second mechanical coupling means on the opposite side of the vehicle such that roll movements acting on the vehicle body are reacted by the second mechanical coupling means on each side of the vehicle,
whereby said vehicle suspension system provides support and roll attitude control of the vehicle body to thereby provide independent control of roll and four wheel bounce stiffnesses and maintain substantially consistent loading on all wheels during axle articulation and thereby maintain traction on all wheels.

2. The vehicle suspension system as claimed in claim 1, wherein each of the first and second mechanical coupling means include two torque transmitting members each attached at one end to a respective wheel assembly and supported by the body to rotate relative thereto, said two torque transmitting members being operably connected by an operable connection such that rotation of one of said two torque transmitting members will attempt to urge rotation of the other torque transmitting member in an at least substantially opposing direction relative to said one torque transmitting member.

3. The vehicle suspension system as claimed in claim 2, wherein the operable connection between each of two torque transmitting members of the respective second mechanical coupling means is arranged such that rotation of one torque transmitting member can induce rotation or contra-rotation of the other torque transmitting member of the said second mechanical coupling means and/or alternatively in at least one of the torque transmitting members of the other said second mechanical coupling means.

4. The vehicle suspension system as claimed in claim 2 or 3, in which the two torque transmitting members in each second mechanical coupling means are connected by an operable connection means whose position is determined by a substantially proportional average of the positions of the two torque transmitting members.

5. The vehicle suspension system as claimed in claim 4, wherein the transfer means are provided to transfer the motion of said operable connection means of one of said second mechanical coupling means, determined by a substantially proportional average of the positions of the two torque transmitting members associated with said one second mechanical coupling means, to the operable connection means of the other second mechanical coupling means on the opposite side of the vehicle to induce a similar substantially proportional average movement in the torque transmitting members of said other second mechanical coupling means.

6. The vehicle suspension system as claimed in claim 1 or 2, wherein at least one of said first and second mechanical coupling means includes a gear train.

7. The vehicle suspension system as claimed in claim 2 or 3, wherein the two torque transmitting members of each said first mechanical coupling means are interconnected by a gear train comprising a respective first bevel gear mounted on each of said two torque transmitting members, and at l east one intermediate bevel gears operably engaging each of the first bevel gears, said intermediate bevel gears being mounted to rotate on a perpendicular axis to urge rotation of one of said two torque transmitting members in response to rotation of the other torque transmitting member in the reverse direction.

8. The vehicle suspension system as claimed in claim 2 or 3, wherein the two torque transmitting members of each second mechanical coupling means are interconnected by a gear train comprising a respective first bevel gear mounted on each of said two torque transmitting members, and an intermediate bevel gear operably engaging each of the first bevel gears, said intermediate bevel gear being supported in a carrier rotatable about a common axis of the first bevel gears of the two torque transmitting members so that the carrier rotates about said common axis in response to the average rotation of the two torque transmitting members of the second mechanical coupling means, said intermediate bevel gear being mounted within the carrier to rotate on an axis relative to the carrier to urge rotation of one of said two torque transmitting members in response to rotation of the other torque transmitting member in the reverse direction.

9. The vehicle suspension system as claimed in claim 8, wherein the transfer means interconnect the carrier of each of the intermediate bevel gears in the two second mechanical coupling means so the rotation of the carrier of one intermediate bevel gear will induce rotation of the carrier of the other intermediate bevel gear in the opposite direction, to thereby control roll of the vehicle body.

10. The vehicle suspension system as claimed in claim 2 or 3, wherein the two torque transmitting members of each second mechanical coupling means are interconnected by a linkage means operable in response to rotation of one of said torque transmitting members to rotate the other of said torque transmitting members in the opposite direction.

11. The vehicle suspension system as claimed in claim 10, wherein the transfer means are provided operably connecting the linkage means of the respective second mechanical coupling means so that movement of one linkage means induced by a substantially proportional average movement of the two torque transmitting members connected thereto will induce an opposite substantially proportional average movement of the two torque transmitting members connected to the other linkage means on the opposite side of the vehicle.

12. The vehicle suspension system as claimed in claim 11, wherein the transfer means between the two linkage means is a fluid pressure activated means.

13. The vehicle suspension system as claimed in claim 11, wherein the transfer means between the two linkage means is a lever system.

14. The vehicle suspension system as claimed in claim 2 or 3, wherein the operable connection between the two torque transmitting members of the respective first mechanical coupling means are arranged such that rotation of one torque transmitting member can induce rotation in the other torque transmitting member of the same first mechanical coupling means and/or in one or both of the torque transmitting members of the other first mechanical coupling means.

15. The vehicle suspension system as claimed in claim 1, including two laterally spaced further wheel assemblies located rearwardly of said rear wheel assemblies and each comprising a wheel and a wheel mounting connecting the wheel to the vehicle body for movement relative to the vehicle body in a generally vertical direction, a further first mechanical coupling means interconnecting said further wheel assemblies in the lateral direction, and further second mechanical coupling means interconnecting each said further wheel assembly to the respective longitudinally adjacent rear wheel assembly, each said further first and second coupling means being adapted to effect in response to movement of one of the rear or further wheel assemblies in a substantially vertical direction a movement of the other wheel assembly connected to the same mechanical coupling means in the opposite direction, whereby all wheels maintain substantially constant loading and thereby maintain traction.

16. The vehicle suspension system as claimed in claim 15, wherein said further first and second mechanical coupling means each include two further torque transmitting members attached at one end to either a rear wheel assembly or a further wheel assembly and supported by the body to rotate relative thereto, said two further torque transmitting members being operably connected so rotation of one will attempt to urge rotation of the other in the opposite direction.

17. The vehicle suspension system as claimed in claim 16, wherein each operable connection between the two further torque transmitting members of the respective further second mechanical coupling means are arranged such that rotation of one further torque transmitting member can induce rotation or contrarotation of the other further torque transmitting member of the same further second mechanical coupling means and/or in one or both of the further torque transmitting members of the other further second mechanical coupling means.

18. The vehicle suspension system as claimed in claim 17, in which adjacent further torque transmitting members are connected by a further operable connection means whose position is determined by a substantially proportional average of the positions of the adjacent further torque transmitting members.

19. The vehicle suspension system as claimed in claim 18, wherein further transfer means are provided which transfer the motion of one of said further operable connection means, determined by a substantially proportional average of the positions of the adjacent further torque transmitting members of one further second mechanical coupling means, to the other further operable connection means on the opposite side of the vehicle, to induce a similar average movement in the torque transmitting members of the other further second mechanical coupling means.

20. A vehicle suspension system as claimed in claim 16 or 17, wherein the two further torque transmitting members of each further second mechanical coupling means are interconnected by a further gear train comprising a respective further first bevel gear mounted on each of said two further torque transmitting members, and a further intermediate bevel gear operably engaging each of the further first bevel gears, said further intermediate bevel gear being mounted to rotate on an axis to urge rotation of one of said further two torque transmitting members in response to rotation of the other further torque transmitting member in the reverse direction.

21. The vehicle suspension system as claimed in claim 20, wherein the further intermediate bevel gears of each further second mechanical coupling means are supported in a carrier rotatable about a common axis of the further first bevel gears of the further two torque transmitting members so that the carrier will rotate about said common axis in response to rotation of the two further torque transmitting members of the further second mechanical coupling means in the same direction.

22. The vehicle suspension system as claimed in any one of claims 17 or 18, wherein the operable connection between the two further torque transmitting members of the further first mechanical coupling means is arranged such that rotation of one further torque transmitting member can induce rotation in the other further torque transmitting member of the same further first mechanical coupling means and/or in one or both of the torque transmitting members of the rear first mechanical coupling means in either a similar or opposite direction.

23. The vehicle suspension system as claimed in claim 22, wherein the first mechanical coupling means at the front of the vehicle is arranged such that rotation thereof can induce rotation in the same or opposite direction of the intermediate first mechanical coupling means and in the same or opposite direction of the first mechanical coupling means at the rear of the vehicle.

24. The vehicle suspension system as claimed in claim 22, wherein the operable connections of all the first mechanical means interconnecting the lateral wheel assemblies are linked in a manner so as to urge each mechanical coupling means to assume substantially its normal load share regardless of any wheel position and to thereby provide optimum control and traction of each associated axle and/or each wheel assembly.

25. A vehicle suspension system comprising at least one pair of laterally spaced forward wheel assemblies and at least one pair of laterally spaced rear wheel assemblies together supporting a vehicle body, each wheel assembly including a wheel and a wheel mounting connecting the wheel to the vehicle body for movement in a generally vertical direction with respect to the vehicle body;

respective vehicle support means mechanically interconnecting the forward pair of wheel assemblies and mechanically interconnecting the rear pair of wheel assemblies, vehicle roll attitude control means respectively mechanically interconnecting longitudinally adjacent pairs of said wheel assemblies on each side of the vehicle;

each said vehicle support means and roll attitude control means being adapted to effect in response to movement of one wheel assembly in the generally vertical direction a movement of the other wheel assemblies connected to said wheel assembly by one of the vehicle support means and one of the roll attitude control means in a substantially opposite direction relative thereto, each roll attitude control means being arranged to respectively generate a movement substantially proportional to the average movement of the two wheels connected thereto on one side of the vehicle; and transfer means to transfer said generated movement to the roll attitude control means on the opposite side of the vehicle, so that the roll attitude control means defines the vehicle body roll attitude, said transfer means also being arranged to transfer forces created by a roll moment on the vehicle body to thereby react said roll moment, and whereby said vehicle support means supports the vehicle weight and provides four wheel bounce resilience, and whereby together substantially consistent loading on all wheels is maintained during non-dynamic axle articulation wheel movements.

26. The vehicle suspension system as claimed in claim 25, wherein each of the vehicle support and roll control means include two torque transmitting members each attached at one end to a respective wheel assembly and supported by the body to rotate relative thereto, said two torque transmitting members being operably connected so rotation of one will urge rotation in the opposite direction of the other torque transmitting member.

27. The vehicle suspension system as claimed in claim 26, wherein operable connection between each of the two torque transmitting members of the respective roll attitude control means is arranged such that rotation of one torque transmitting member can induce rotation or contra-rotation of the other torque transmitting member of the said roll attitude control means and/or alternatively in at least one of the torque transmitting members of the other said roll attitude control means.

28. The vehicle suspension system as claimed in claim 26, in which the two torque transmitting members in each roll attitude control means are connected by an operable connection means whose position is determined by a substantially proportional average of the positions of the two torque transmitting members.

29. The vehicle suspension system as claimed in claim 28, wherein transfer means are provided which transfer the motion of said operable connection means of one of said roll attitude control means, determined by a substantially proportional average of the positions of the two torque transmitting members associated with said one roll attitude control means, to the operable connection means of the other roll attitude control means on the opposite side of the vehicle, to induce a similar average movement in the torque transmitting members of said other roll attitude control means.

30. The vehicle suspension as claimed in any of claims 22 or 26, wherein one of the torque transmitting members of any or all of the first mechanical coupling means or further first mechanical coupling means comprises two torsion bars connected by a vehicle height adjustment means, the vehicle height adjustment means being operable to effect rotation of one of the torsion bars with respect to the other, thereby changing the height and/or pitch attitude of the vehicle.

31. The vehicle suspension as claimed in claim 30, wherein both of the torque transmitting members of any or all of the first mechanical coupling means or further first mechanical coupling means comprise two torsion bars connected by a vehicle height adjustment means, the vehicle height adjustment means being operable to effect rotation of one of the torsion bars with respect to the other, thereby changing the height and/or pitch attitude of the vehicle.

32. The vehicle suspension as claimed in claim 1 or 25, wherein the transfer means include vehicle roll attitude adjustment means, the vehicle roll attitude adjustment means being operable to effect rotation of the second mechanical coupling means on one side of the vehicle relative to the second mechanical coupling means on the opposite side of the vehicle, thereby changing the roll attitude of the vehicle.

* * * * *